Jan. 17, 1956
G. A. SPENCER
2,731,253
RUBBER FOAM MIXER
Filed Jan. 5, 1953
4 Sheets-Sheet 1
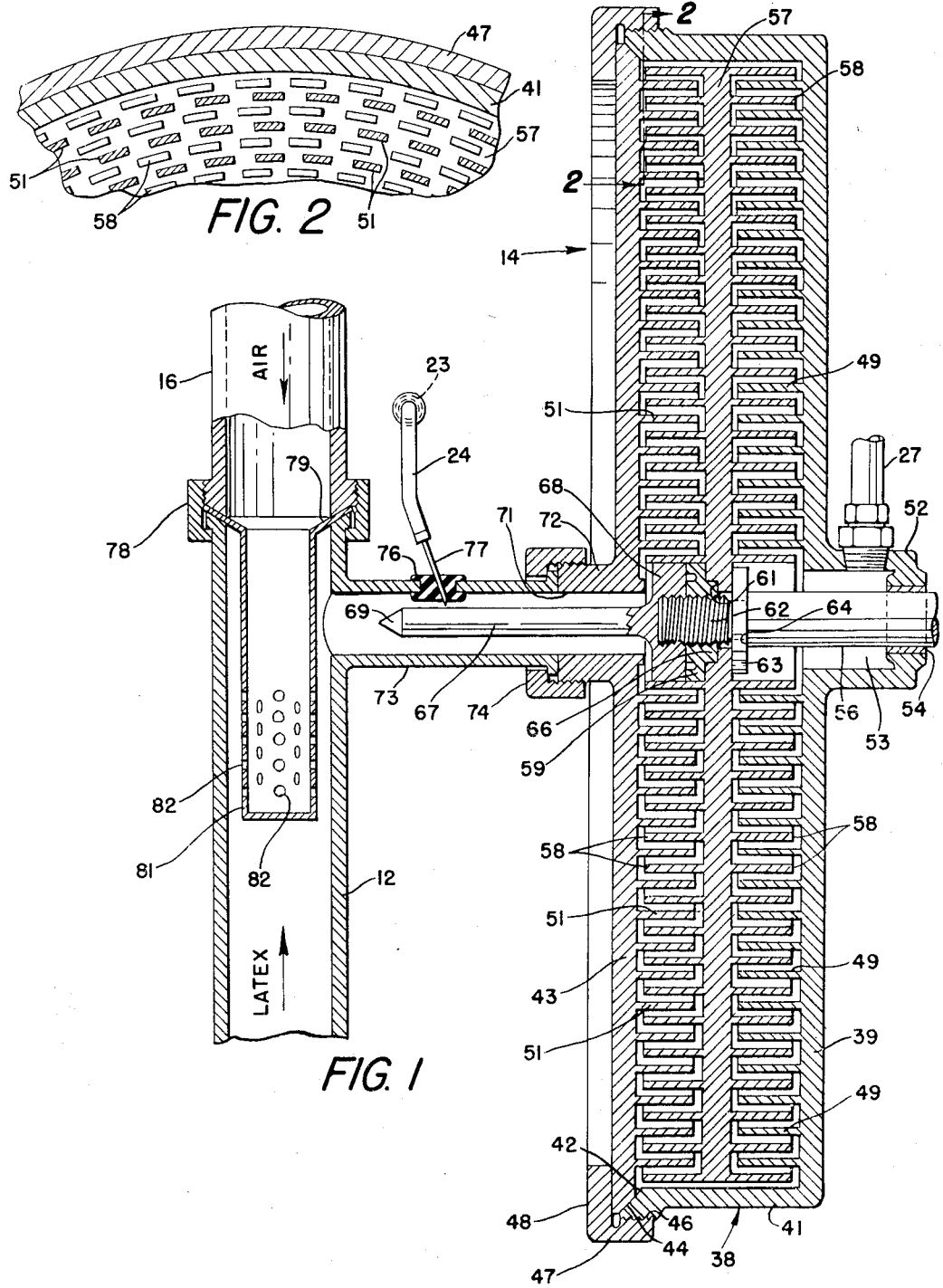

Jan. 17, 1956     G. A. SPENCER     2,731,253
RUBBER FOAM MIXER

Filed Jan. 5, 1953     4 Sheets-Sheet 2

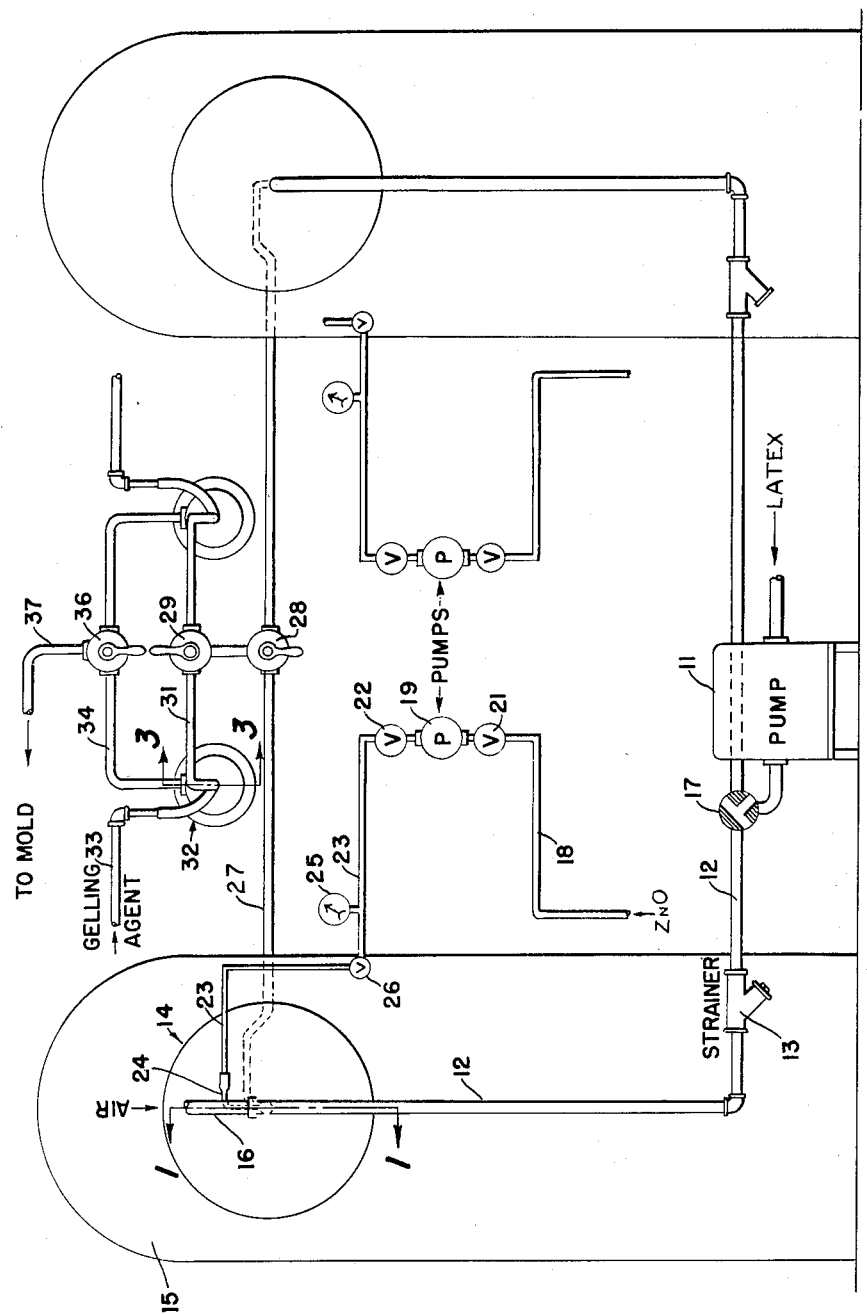

Jan. 17, 1956   G. A. SPENCER   2,731,253
RUBBER FOAM MIXER

Filed Jan. 5, 1953   4 Sheets-Sheet 4

INVENTOR.
GEORGE A. SPENCER
BY
Ely & Frye
ATTORNEYS

United States Patent Office 2,731,253
Patented Jan. 17, 1956

2,731,253

RUBBER FOAM MIXER

George A. Spencer, Akron, Ohio, assignor to The Firestone Tire & Rubber Company, Akron, Ohio, a corporation of Ohio Application January 5, 1953, Serial No. 329,641

2 Claims. (Cl. 261—118)

This invention relates to a mixer for foam rubber. According to current methods of foaming rubber, a continuous stream of latex is mixed with air and a gelling agent, and passed through a beater comprising a drum having a labyrinth of rotors and stators through which the foam courses radially outwardly and inwardly, and is reduced to a fine emulsion. This application is a continuation in part of my previous application which has matured into Patent No. 2,627,394, dated February 3, 1953. One of the chief problems in this process is the occurrence of what is known as "blow-by" wherein large gobs of air evade intimate mixture and pass on through the system, with resultant lack of fineness and uniformity in the product. It is, therefore, a principal object of the invention to eliminate "blow-by."

Conventional mixers have been constructed wtih the rotor shaft journaled in the mixer housing on both sides of the rotor. In this arrangement latex had to be fed into the mixer at a location offset from the rotor axis. In this system, "blow-by" was pronounced and it was necessary to run the foam through two mixers in succession to abate the difficulty in reasonable degree. According to the invention, the rotor is mounted cantilever fashion, enabling axial feed and consequently reduction of "blow-by." It is, therefore, a more particular object of the invention to provide for axial feed of foam into a mixer. Other objects are to correlate axial feed with proper airmixing and introduction of gelling agents. As a feature of this correlation, an axial torpedo head is provided on the rotor, outboard of the rotor in proximity to the mixing device.

The invention is described in detail in the accompanying specification, as illustrated in the drawings, in which:

Fig. 1 is an axial, sectional view of a mixer and a feed line having an air disperser, as seen on the line 1—1 of Fig. 5;

Fig. 2 is a view taken on the line 2—2 of Fig. 1;

Fig. 5 is a schematic view showing the mixer layout; and

Figure 4:
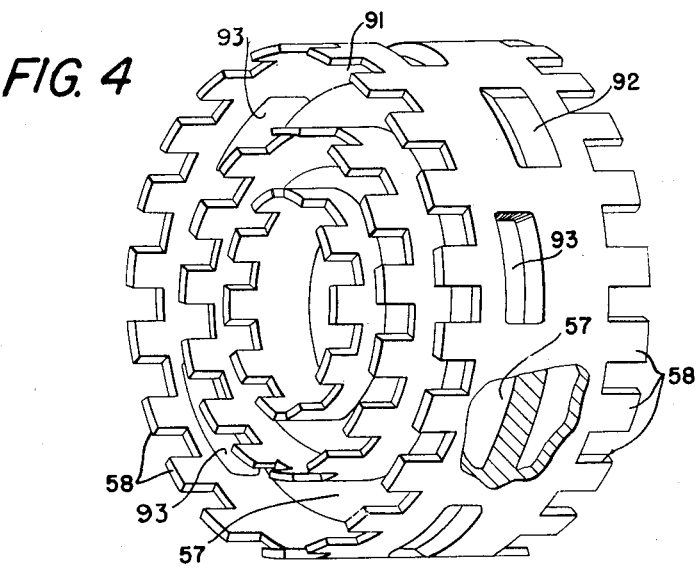
Fig. 4 is a perspective view, partly broken away, of the rotor of the Fig. 3 mixer.

The system shown in Fig. 5 comprises duplicate units on each side of a median, vertical line, which units may be put in service alternately, so that production is not interrupted during periods of cleaning or repair. Therefore, only one side of the system need be described. A pump 11 forces latex from a suitable vat (not shown) through a pipe line 12, including a strainer 13, to a mixing unit 14 supported on a housing 15. A line 16 is connected to line 12 at the mixer to introduce air under pressure. A motor (not shown) for driving the rotor of unit 14 is enclosed in housing 15. A valve 17 permits reversing the feed from one side of the system to the other, or shutting it off.

Zinc oxide, which, besides its usual function as an accelerator of vulcanization, also assists in the gelling of the foam, is drawn from a supply (not shown) through a pipe 18 by a pump 19 equipped with valves 21, 22, and forced through a line 23 with a flexible hose 24 to a point in feed line 12 adjacent mixer 14. The flow of zinc oixde is indicated by a gage 25, and a cut-off valve 26 is provided between the gage and the mixer.

The beaten foam passes from mixer 14 into a line 27, thence through reversing valves 28, 29 in succession, and through a line 31 to a second, smaller mixer 32. At mixer 32 a gelling agent, sodium silica fluoride, is introduced into the foam through a line 33 leading from a source of supply (not shown). The foam leaves mixer 32 through a line 34, thence through a reversing valve 36 and a line 37 to the station where the foam is squirted into the molds.

The mixer 14 is shown in detail in Fig. 1. This includes a stator housing having a drum-shaped portion 38 with base wall 39 and a ring-form flange 41. The outer edge of flange 41 is beveled on the inner corner at 42 to receive, in mating relation, a cover plate 43 having a similarly beveled, inner corner 44. Flange 41 is exteriorly threaded at 46 to receive an interiorly threaded ring 47 having a flange 48 overlapping cover 43 and securing the cover in liquid-sealing relation on the drum.

The interior surface of base 39 of the drum is provided with stator blades in the form of arcuate segments 49, integral with the base, and arranged in a series of circles concentric with the axis of the drum. A series of similar arcuate segments 51, integral with cover 43, are also arranged on concentric circles which are aligned with the respective circles of segments 49.

The drum 38, which is suitably supported on housing 15 in any convenient manner, has a hub 52 defining an outlet chamber 53, and the outlet pipe 27 is threaded in an opening in the hub. The hub also has an axial opening provided with packing 54 through which the rotor shaft 56 passes.

The rotor comprises a circular disk 57 having on each face protruding, integral, arcuate segments 58 arranged in concentric circles and located so as to extend between the stator segments 49 and 51 on the housing.

A headed nut 59 provided with spanner holes, which is received in a central opening 61 of the rotor, is internally threaded for reception on the threaded, reduced end 62 of shaft 56. A washer 63 abuts a shoulder 64 on the shaft and thus serves to properly locate the rotor axially of the stator blades. The head 66 of nut 59 clamps the rotor against washer 63.

Also threaded on end 62 of the shaft is a cylindrical torpedo head 67 having a base 68 with threaded axial bore, and a conical, outer end 69. The torpedo extends through an axial opening 71 in a hub 72 of housing cover 43, in spaced relation thereto. The latex supply tube 12 has a branch passage 73 axially aligned with and abutting hub 72, to which it is secured by a union 74. A rubber grommet 76, secured in an opening in branch 73, holds a needle 77 through which zinc oxide from line 23 is introduced into the latex-air mixture.

Pipes 12 and 16 are joined by a union 78, and between the pipe ends is clamped the frusto-conical flange 79 of a tube 81 having perforations 82 in its side walls in a zone preferably below the line of branch 73. The air must pass through perforations 82 before contacting the latex. In this passage, the air is uniformly dispersed in the latex radially of the tube and is rendered turbulent, and an intimate mixing of air and latex results prior to entry into branch 73. At a point slightly within branch 73, the stream of aerated latex is cleaved by head 69 of the torpedo, so as to diverge uniformally outwardly of the torpedo axis. It is thus conditioned for uniform, radial spreading when it enters mixer housing 38, since the tubular form of the stream is formed in the aerator and persists as it moves along the rotating torpedo in the mixer. At a point just beyond head 69 of the torpedo, the zinc oxide is added in metered amounts through needle 77.

Figure 6:
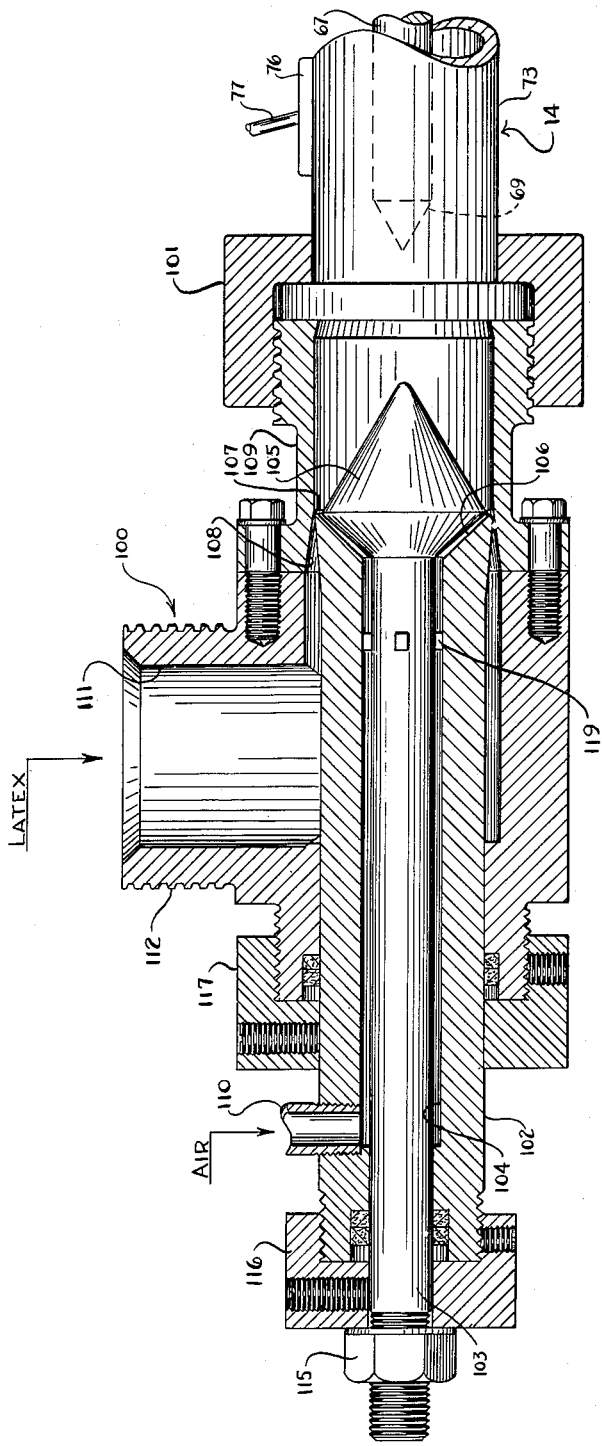
Fig. 6 is a longitudinal view partially in section of a modification of the aerator of the invention.

A second modification of the aerator is illustrated in Fig. 6 generally indicated at 100 and is comprised of T-shaped member 112 bolted to mixer chamber housing 109 and internally mounting metering rod housing 102. The aerator is coupled to branch passage 73 of mixing unit 14 by coupling 101. Metering rod 103 is axially mounted in bore 104 of the metering rod housing 102 and this rod is provided at one end with conical metering head 105. The opposite end of rod 103 is provided with threads adapted to cooperate with nut 115. Lugs 119 on rod 103 provide for axial alignment of the rod in the bore. It will be noted that the diameter of bore 104 is greater than the diameter of rod 103 to provide for passage of air under pressure admitted through air inlet pipe 110.

T-shaped member 112 is provided with an L-shaped annular passage 111 one leg of which is concentric with an annular chamber 108 in member 109. Chamber 108 tapers to a decreased diameter to provide a narrow annular clearance 107 with the end of metering rod housing 102. The end of meter rod housing 102 adjacent to 108 flares to increased diameter to define the inner circumference of annular clearance 107. Likewise bore 104 flares outwardly to define with the base of metering head 105 annular passage 106.

In operation of the aerator latex enters through the opening of passage 111 from suitable means not shown engulfs metering rod housing 102 and flows through annular clearance 107. Simultaneously air under pressure is forced through air inlet 110, bore 104 and through the annular passage 106 defined by the metering head 105 and the flared end of metering rod housing 102. Escape of air through passage 106 results in a turbulent mixing of air and latex in the reduced portion of chamber 108. Undesirable effects of turbulence on the line pressure of the latex are minimized by the conical shape of metering rod head 105. The aerated latex travels from chamber 108 into passage 73 for treatment by mixer 14 as hereinafter described.

Flow of latex in the aerator is controlled by longitudinal adjustment of metering rod housing 102 secured by locking collar 117. Longitudinal adjustment of housing 102 varies clearance 107 to increase or decrease the volume of latex permitted to enter the reduced portion of mixing chamber 108. In a like manner longitudinal adjustment of metering rod 103 by manipulation of nut 115 locked by collar 116 increases or decreases the volume of air permitted to enter mixing chamber 108.

Figure 3:
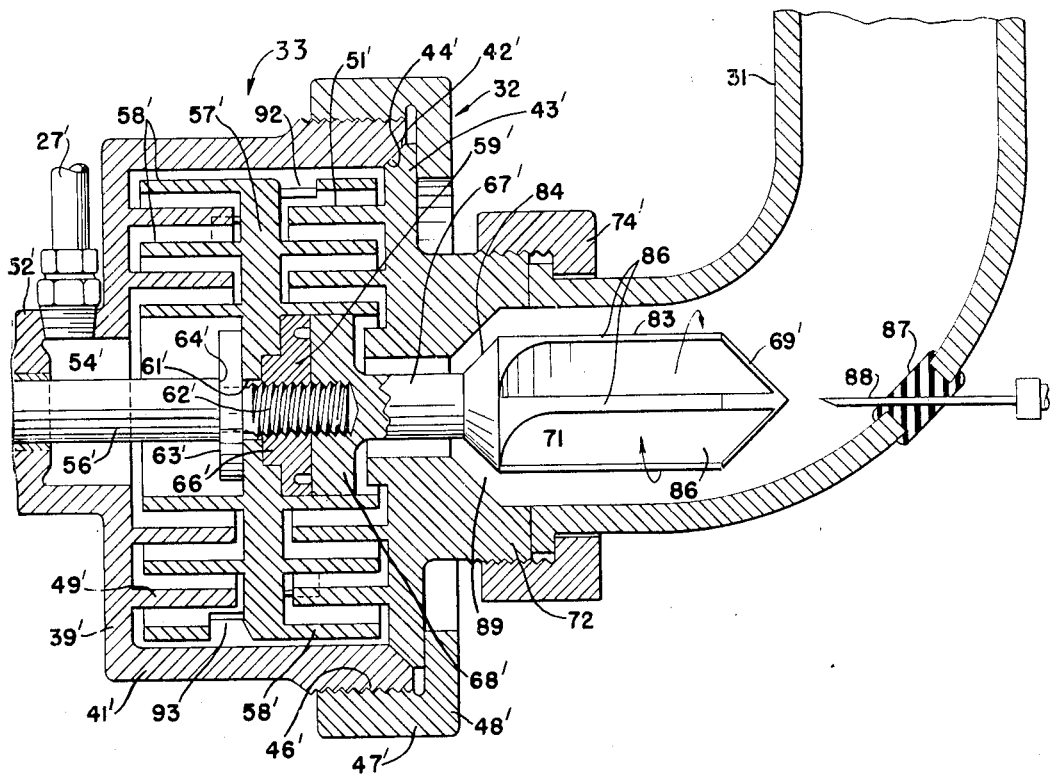
Fig. 3 is an axial, sectional view of a modifier mixer, as seen on the line 3—3 of Fig. 5.

Within the mixer 38, the latex-air-ZnO mixture progresses through the labyrinth of baffles radially outwardly of the mixer and is thoroughly churned at the same time, with the result that the air bubbles are reduced to a minute size while retaining a uniform degree of dispersion. After reaching the outer wall 41 of the mixer, the foam is urged back toward the mixer axis by the line pressure, and in this passage the beating of the foam is continued. Finally, the foam reaches chamber 53 and moves out through line 27, to pass to the second mixer 32, shown in detail in Figs. 3 and 4, the purpose of which is to disperse the gelling agent while maintaining the fine and uniform condition of the foam. Mixer 32, although of considerably reduced size, is generally similar to mixer 14 and corresponding parts have therefore been indicated by similar reference numerals, qualified by prime marks.

Other than its size, the chief difference in mixer 32 is in the form of the torpedo. In the modified form, the torpedo has an enlarged head 83 joined to the shank 67' by a tapered shoulder 84. Head 83 has a conical tip 69' and is milled to provide 4 vanes 86. A grommet 87 holds a needle 88 through which the gelling agent is introduced, the needle being aligned with the axis of the torpedo and the needle point being closely adjacent the apex of the cone 69'. The enlarged form of torpedo head and the twisting imparted by the vanes have been found to be very effective in properly mixing the gelling agent. It is equally important that the foam be again restricted to a tube of small radius (by passage 89 adjacent tapered shoulder 84), so that the degree of dispersion is not lowered, and the stream is as near the axis as possible when it enters the rotor housing.

Another difference in the smaller mixer lies in the fact that the spaces 91 between the rotor segments do not extend to the rotor disc 57' but only about half way thereto. This produced better foam, but for reasons unknown. It was also found that the product was improved by providing by-pass openings 92, 93, in the outer wall of the rotor. The effect of these ports seems to be a remixing, which blends out "pulse" effects due to "pulse" feeding of the gelling agent through the injector. These ports may also be provided on the inner circles of the rotor.

By the means shown and described, "blow-by" has been minimized in foamers by thoroughly mixing the air and latex and, thereafter, promptly presenting the stream of foam to a streamlining device in the form of a torpedo which maintains the flow in a tubular path of small radius, so that air and latex do not segregate, and introduces the foam into the mixer adjacent the axis thereof, and in a condition of symmetry with respect to said axis. By suitable modification this system has been shown to have additional utility in a mixer associated with introduction of a gelling agent.

While certain preferred embodiments have been shown and described, the invention is not limited thereto, since modifications are possible within the spirit and scope of the appended claims.

What is claimed is:

1. In apparatus for processing latex the combination of a foam mixer and an aerator, the mixer having circularly arranged stator blades, a driven shaft arranged axially of said stator blades, a rotor secured to said shaft and having blades arranged for cooperation with said stator blades, means defining a tubular inlet opening arranged coaxially of said shaft for feeding latex into said housing, the aerator having a T shaped conduit with conically tapered walls forming a passage defining a converging path of flow for latex through one arm, said arm attached to and axially aligned with said tubular inlet, a cylindrical housing provided with an axial bore, the housing of less diameter than and axially mounted in said passage with one end substantially concentric with said tapered walls, a metering rod of less diameter than said bore centered in and extending at least the length of said bore and adapted for longitudinal movement, means defining a tubular air inlet communicating with said bore, bore blocking means on the end of said rod at said one end of said housing and adapted to deflect the flow of air from the bore across said path of flow of latex in said passage, means on the end of said rod opposite said bore blocking means adapted to move said rod longitudinally in said bore, means on said conduit for varying the length of said housing in said passage, and a free end extension on said mixer shaft extending into said latex inlet opening, radially spaced from the walls thereof and axially aligned with said passage in said aerator, whereby the latex passing through said housing is aerated and formed into a tubular shape as it passes from the aerator to the mixer.

2. A combination of a foam mixer and an aerator according to claim 1 wherein the bore of the cylindrical housing flares out at said one end to provide a dish-shaped seat and the bore blocking means is a conical tip resting in base to base relation with a truncated cone portion merging with said rod, the walls of said truncated cone portion extending along the walls of said recess and diverging in a radially inward direction.

References Cited in the file of this patent

UNITED STATES PATENTS

| | | |
|---|---|---|
| 49,318 | Taltavull | Aug. 8, 1865 |
| 207,827 | Starbuck | Sept. 10, 1878 |
| 368,266 | Wright | Aug. 16, 1887 |
| 956,065 | Fleming | Apr. 26, 1910 |
| 1,067,653 | Hearing | July 15, 1913 |
| 1,670,593 | Miller | May 22, 1928 |
| 1,739,360 | Hopkins | Dec. 10, 1929 |
| 2,313,760 | McLean | Mar. 16, 1943 |
| 2,328,950 | Brant | Sept. 7, 1943 |
| 2,389,486 | Colony | Nov. 20, 1945 |
| 2,627,394 | Spencer | Feb. 3, 1953 |
| 2,642,813 | Woodruff et al. | June 23, 1953 |

FOREIGN PATENTS

| | | |
|---|---|---|
| 105,776 | Australia | Nov. 24, 1938 |